United States Patent
Masson et al.

(10) Patent No.: US 12,136,943 B2
(45) Date of Patent: Nov. 5, 2024

(54) VERY-LOW-CONSUMPTION RECONFIGURABLE-WAVEFORM COMPACT UWB EMITTER

(71) Applicant: COMMISSARIAT À L'ÉNERGIE ATOMIQUE ET AUX ÉNERGIES ALTERNATIVES, Paris (FR)

(72) Inventors: Gilles Masson, Grenoble (FR); Frédéric Hameau, Grenoble (FR); Laurent Ouvry, Grenoble (FR)

(73) Assignee: COMMISSARIAT A L'ENERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 278 days.

(21) Appl. No.: 17/627,516

(22) PCT Filed: Jul. 10, 2020

(86) PCT No.: PCT/FR2020/051248
§ 371 (c)(1),
(2) Date: Jan. 14, 2022

(87) PCT Pub. No.: WO2021/009452
PCT Pub. Date: Jan. 21, 2021

(65) Prior Publication Data
US 2022/0285839 A1 Sep. 8, 2022

(30) Foreign Application Priority Data

Jul. 15, 2019 (FR) ...................................... 1907944

(51) Int. Cl.
*H04B 1/717* (2011.01)
*H04B 1/7163* (2011.01)
*H04L 27/20* (2006.01)

(52) U.S. Cl.
CPC ......... *H04B 1/717* (2013.01); *H04B 1/71635* (2013.01); *H04L 27/20* (2013.01)

(58) Field of Classification Search
CPC .... H04B 1/717; H04B 1/7172; H04B 1/7174; H04B 1/7163; H04B 1/71632; H04B 1/71635; H04L 27/20
See application file for complete search history.

(56) References Cited

U.S. PATENT DOCUMENTS

| | | | | |
|---|---|---|---|---|
| 7,664,161 | B2 * | 2/2010 | Norimatsu | ........... H04B 1/7174 375/135 |
| 9,054,789 | B2 * | 6/2015 | Bourdel | ............. H04B 1/71632 |
| 2012/0027050 | A1 | 2/2012 | Bourdel et al. | |

OTHER PUBLICATIONS

Chul, Kim et al. "Design of a Tunable All-Digital UWB Pulse Generator CMOS Chip for Wireless Endoscope" IEEE Transactions on Biomedical Circuits and Systems, first published Mar. 24, 2010, vol. 4, No. 2, pp. 118-124.

(Continued)

*Primary Examiner* — Betsy Deppe
(74) *Attorney, Agent, or Firm* — Pearne & Gordon LLP

(57) ABSTRACT

A UWB pulse emitter includes an H-bridge having first and second branches in parallel, a first end common to the branches being connected to a first amplitude control module to regulate a high voltage, a second end common to the branches being connected to a second amplitude control module to regulate a low voltage. A first envelope control module controls the shape of the positive portion of a UWB pulse and a second envelope control module controls the shape of the negative portion of this pulse. Each branch comprises first and second switches for respectively switching the high voltage to a first or second input of the first envelope control module and the low voltage to a first or second output of the second envelope control module. Centre taps of the branches, between which the UWB (Continued)

antenna is connected, connect the outputs and the inputs of the control modules.

20 Claims, 12 Drawing Sheets

(56)  References Cited

OTHER PUBLICATIONS

Chul, Kim et al. "A 15pJ/Pulse All-Digital UWB Pulse Generator with Pulse Tuning Capability" Circuits and Systems, IEEE, Aug. 10, 2008, pp. 578-581.
Search Report for French Application No. FR1907944 dated Mar. 5, 2020.
International Search Report for PCT/FR2020/051248 dated Oct. 7, 2020 and translation thereof.
Written Opinion for PCT/FR2020/051248 dated Oct. 7, 2020.

* cited by examiner

VERY-LOW-CONSUMPTION RECONFIGURABLE-WAVEFORM COMPACT UWB EMITTER

CROSS-REFERENCE TO RELATED APPLICATIONS

This is a National Stage application of PCT international application PCT/FR2020/051248, filed on Jul. 10, 2020, which claims the priority of French Patent Application No. 1907944, filed Jul. 15, 2019 both of which are incorporated herein by reference in their entireties.

TECHNICAL FIELD

The present invention relates to the field of ultra-wideband or UWB pulse generation, in particular that of UWB emitters using low impedance RF antennas. It finds particular application in the field of the localisation of connected objects, in that of UWB radars as well as in communication systems in compliance with the IEEE 802.15.4-2011 standard.

Prior Art

UWB signals are used in a large number of applications, whether for location or communication needs. The spectra of these signals must be compliant with spectral masks decreed by the FCC in the United States and the ETSI in Europe, so as not to interfere with spectral bands already in use. The IEEE 802.15.4-2011 standard, relating to LR WPAN (*Low Rate Wireless Personal Area Network*) type networks using UWB signals, provides for several communication channels 600 MHz and 1300 MHz wide in the 3.1-10.6 GHz band with associated spectral masks. A UWB signal is composed of UWB pulses. Next, the term UWB pulse will denote a sequence of RF cycles having an envelope function such that it complies with the aforementioned spectral masks.

UWB emitters should adopt a reconfigurable architecture so as to be able to adapt to the different considered applications, in particular to different channels, different bandwidths, different types of data modulation, different emission levels, different spectral masks.

Moreover, UWB emitters are often intended to equip connected objects, having by construction only a low autonomy in energy (small-size battery). The widespread of these objects also speaks in favour of reducing their energy consumption, so as to limit their environmental footprint.

The different types of UWB emitter known from the state of the art comply with a general architecture, 100, as represented in FIG. 1.

According to this general architecture, a UWB emitter comprises a module for shaping the envelope of the pulse and of the RF clock, designated by 110. This module is intended to generate an RF signal at the central frequency of the UWB signal, $f_0$, from a clock signal of the same frequency, to shape the pulse so that it has the desired envelope. Furthermore, when a modulation has to be carried out, generally an all or nothing modulation, OOK (On Off Keying), or a polarity modulation, BPSK (Binary Phase-Shift Keying), the module 110 could apply this modulation to obtain modulated UWB pulses.

Afterwards, the UWB pulse at the output of the module 110 is amplified by the power amplification module 120 before being transmitted by the antenna 150. The power amplification stage is necessary due to the low impedance of the antenna.

It is possible to distinguish two large families of UWB emitters: those using memory elements and delay lines to generate the pulses digitally and those using "H" bridges to generate them in analogue.

An example of an emitter belonging to the first family is described in the patent U.S. Pat. No. 8,179,945 in the name of the present Applicant. The pulses to be generated are represented in the form of sequences of digital samples stored in a memory and read sequentially at the central frequency, $f_0$. Afterwards, the amplification is carried out by thermometric paralleling of digital buffers allowing adjusting the gain.

Nonetheless, such an emitter consumes energy to the extent that the pulses are shaped at the central frequency, alternation by alternation.

Furthermore, even though the digital generation is itself reproducible, the parasitic capacitances present in the combination stage and the amplification stage distort the waveform, so that the spectrum of the transmitted UWB signal is relatively unpredictable. Furthermore, digital buffers produce large current in rushes, which leads to parasitic variations of the power supply potential and of the ground and makes it even more difficult to control the spectrum of the emitted signal.

The aforementioned second family of UWB emitters uses an "H"-bridge architecture as represented in FIG. 2.

This bridge comprises two parallel branches, 210b and 220b, each having a midpoint, respectively at 251 and 252. The UWB antenna, 250, is mounted between the considered two midpoints (hence the H-like shape of the bridge). The first branch, 210b, comprises a first switch 213 between the power supply terminal VDD and the midpoint 251 as well as a second switch 217 between the midpoint 251 and the ground. Similarly, the second branch, 220b, comprises a first switch 223 between the power supply terminal and the midpoint 252 as well as a second switch 227 between the midpoint 252 and the ground. The switches are made in CMOS technology. The first switch, 213, of the first branch, as well as the second switch of the second branch 227 are controlled by a first clock signal ClkRF−. The first switch, 223, of the second branch, as well as the second switch, 217, of the first branch are controlled by a second clock signal, ClkRF+ with a reverse polarity with respect to that of the first clock signal. Thus, when the first clock signal is at a high level, the current flows in the first switch, 213, of the first branch, in the antenna 250, in a first direction, then in the second switch, 227, of the second branch. Conversely, when the first clock signal is at a low level, the current flows in the first switch 223 of the second branch, in the antenna 250, in a second direction, opposite to the first direction, then in the second switch, 217, of the first branch.

The main advantage of this "H"-bridge architecture is that the current efficiency is optimal to the extent that the impedance adaptation is performed by CMOS switches with very high input impedance. On the other hand, the voltage excursion at the terminals of the load (the antenna 250) is optimal and close to 2×VDD given that the potential drop across the CMOS switches in the on state is very low (resistance of a few Ohms).

An example of a UWB emitter adopting a "H"-bridge architecture is described in patent application US-A-2012/0027050, in particular in FIG. 4 of this document. In this example, a UWB pulse is synthesised alternation by alternation at the central frequency using fast logics and the considered alternations are then amplified (using a plurality of reference voltages) and combined into a "H"-bridge including as many branches in parallel as there are alternations in the UWB pulse to be generated.

This architecture also leads to a high energy consumption to the extent that the synthesis of the UWB pulse is again carried out alternation by alternation at the central frequency. It is also complex since it requires as many reference voltages (at low output impedance) as there are amplitude levels for the different alternations composing the pulse.

Furthermore, the control of the spectrum of the UWB signal is difficult to predict because the parasitic capacitances present in the logic combination stages and in the combination stage formed by the "H"-bridge distort the UWB pulse by filtering.

Finally, the number of available reference voltages limits the reconfigurability of the generator.

Consequently, the present invention aims to provide a UWB emitter architecture with very low consumption, which is reconfigurable and allows accurately controlling the spectrum of the emitted UWB pulses.

DISCLOSURE OF THE INVENTION

The present invention is defined by a UWB pulse emitter as given by claim 1. Advantageous embodiments are specified in the dependent claims.

BRIEF DESCRIPTION OF THE DRAWINGS

Other features and advantages of the invention will appear upon reading a preferred embodiment of the invention, described with reference to the appended figures among which.

DETAILED DISCLOSURE OF PARTICULAR EMBODIMENTS

The general idea underlying the invention is to provide a UWB emitter based again on an "H"-bridge structure but integrating within the branches of the bridge, on the one hand, a baseband control of the shape of the envelope of the UWB pulses and, on the other hand, a control of the amplitude of these pulses, distinct from the control of the shape of the envelope.

Figure 3:
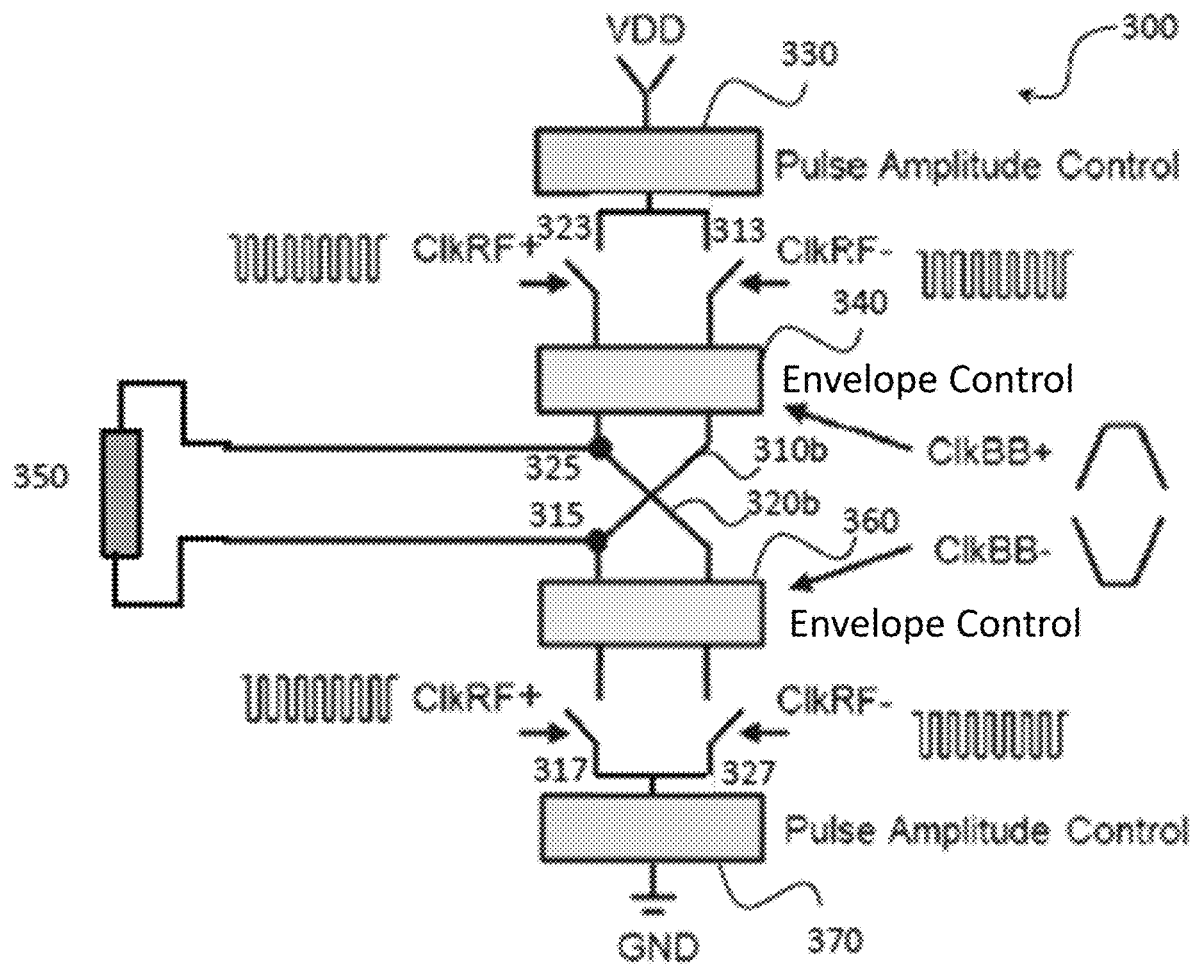
FIG. 3 schematically represents the general architecture of a UWB emitter, according to a first embodiment of the invention.

FIG. 3 schematically represents the general architecture of a UWB emitter, according to a first embodiment of the invention.

The UWB emitter is based on an "H"-bridge, 300, comprising two branches in parallel. Like in the bridge of FIG. 2, we find in the first branch, a first switch 313, a midpoint 315 and a second switch 317. In the same way, we find in the second branch a first switch 323, a second midpoint 325 and a second switch 327. The first switch, 313, of the first branch, as well as the second switch of the second branch 327 are controlled by a first clock signal ClkRF−. The first switch, 323, of the second branch, as well as the second switch, 317, of the first branch are controlled by a second clock signal, ClkRF+ with a reverse polarity with respect to that of the first clock signal. The first and second clock signals have a frequency equal to the central frequency (RF frequency) of the UWB pulses to be generated.

The UWB antenna 350 rising between the first midpoint 315 and the second midpoint 325. It is fed in a differential manner (differential fed antenna).

Figure 1:
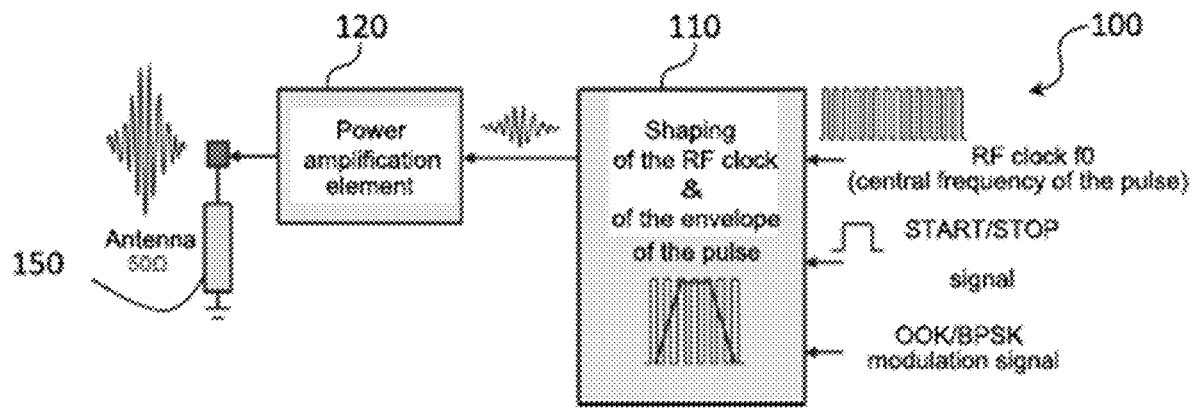
FIG. 1 schematically represents the general architecture of a UWB emitter known from the state of the art.
Figure 2:
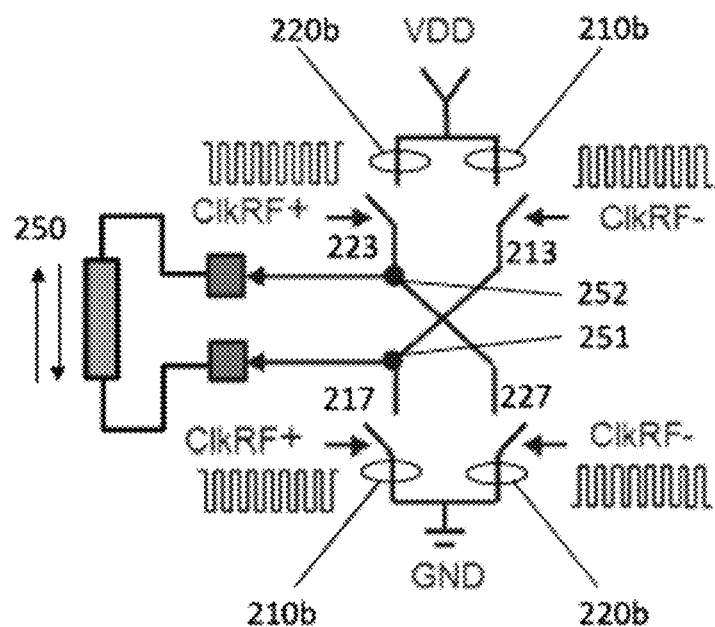
FIG. 2 schematically represents an "H"-bridge used in a UWB emitter known from the state of the art.

Unlike in FIG. 2, the UWB emitter comprises a first amplitude control module, 330, intended to control the amplitude of the positive part of the envelope of the UWB pulse, this module being located between the supply terminal and a first common end of the first and second branches. The first amplitude control module allows adjusting the voltage (called the high voltage) applied to the first common end.

Symmetrically, it comprises a second amplitude control module, 370, intended to control the amplitude of the negative part of the UWB pulse, this module being located between a second common end of the first and second branches, and the ground. The second amplitude control module allows setting the voltage (called low voltage) applied to the second common end.

The UWB emitter further comprises a first envelope control module, 340, intended to control, by means of a first shape control signal, ClkBB+, the shape of the envelope of the positive part of the UWB pulse, this module being located between the first switches 313, 323 and the corresponding midpoints 315, 325. Symmetrically, it comprises a second envelope control module, 360, intended to control by means of a second shape control signal, ClkBB−, the shape of the envelope of the negative part of the UWB pulse, this module being located between the midpoints 315, 325 and the second switches of the first and second branches 317, 327. It is important to note that the shape control signals ClkBB+ and ClkBB− are low frequency signals (in baseband) because they correspond to the amplitude modulation of the UWB pulses. In other words, the spectrum of these shape control signals is located in a spectral band well below the central frequency, $f_0$ of the UWB pulses. The control of the shape of the envelope of the low-frequency pulse instead of the synthesis of each of the half-waves at the RF frequency, $f_0$ allows significantly reducing the consumption of the emitter.

The UWB emitter architecture illustrated in FIG. 3 has several advantageous features.

First of all, the amplitude control is carried out statically by simply controlling the high voltage (by means of the module 330) and the low voltage (by means of the module 370) at the ends of the branches. Thus, we avoid digitally storing waveforms of several gain levels or generating in analogue a large number of reference voltages.

Then, the shape of the envelope of a UWB pulse emitted by the emitter is differentially controlled by the first and second envelope control modules 340 and 360. The control of the shaping of the UWB pulses is independent of the control of their amplitude. These two controls operate in series directly in the power amplification stage, without any particular need for impedance adaptation or additional circuitry, which also contributes to the reduction of the overall consumption of the emitter.

Furthermore, the control of the pulse spectrum is simple and accurate. The envelope shape control signals could be generated at low frequency with simple components. They are applied directly to the power amplification stage without the need to introduce an impedance transformation stage. The presence of an envelope shaping stage between the switches and the load (in this case the UWB antenna) allows isolating the latter against switching transients at the RF frequency. This property contributes to the spectral purity of the generated UWB pulses and therefore to their compliance with the spectral mask.

Figure 4A:
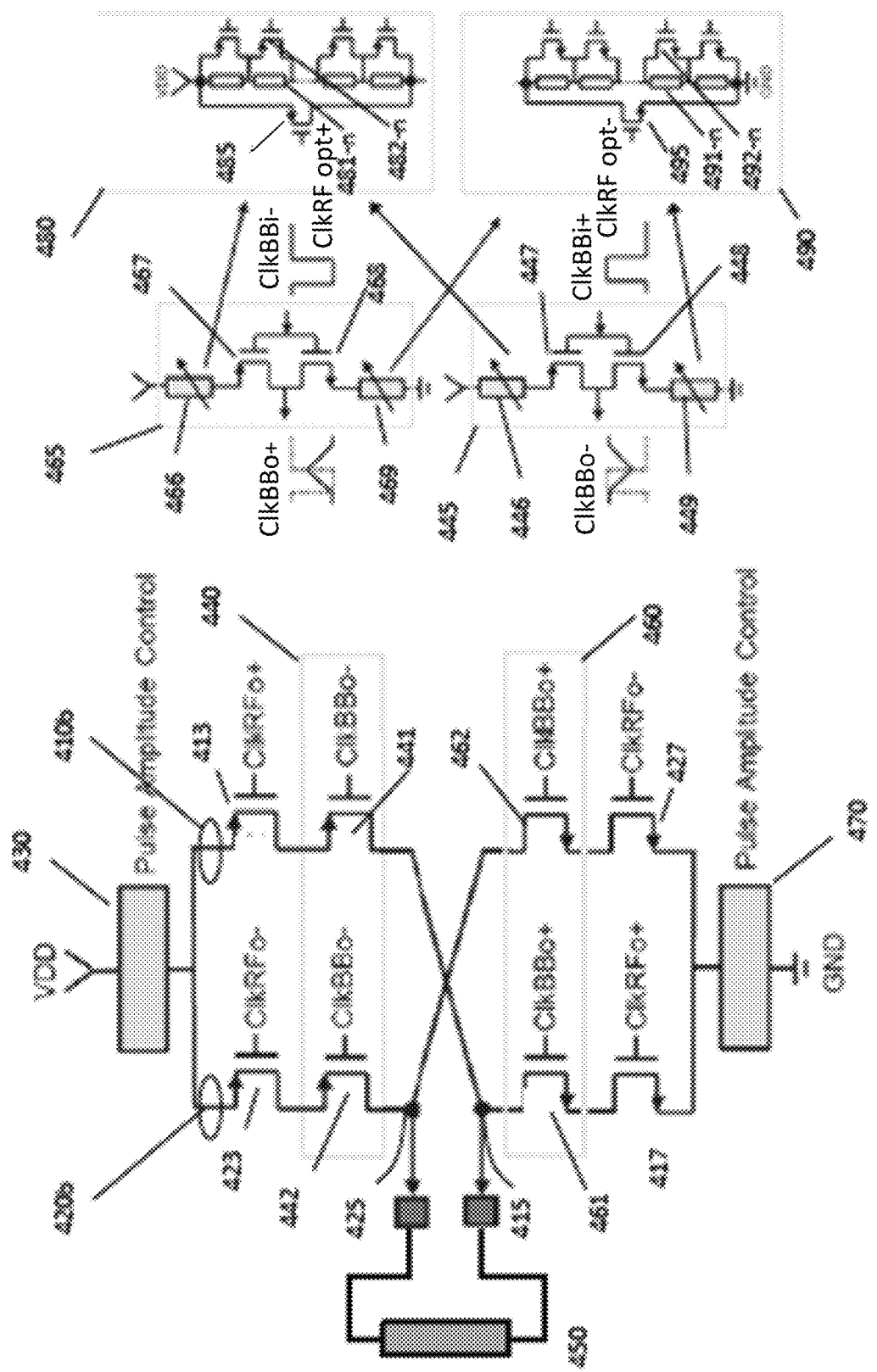
FIG. 4A schematically represents a UWB emitter according to the general architecture of FIG. 3, detailing an example of implementation of the first and second envelope shape control modules.

FIG. 4A schematically represents a UWB emitter in accordance with the general architecture of FIG. 3 and detailing an example of implementation of the first and second envelope shape control modules.

The figure represents the first and second switches, 413, 417 of the first branch 410, as well as the first and second switches, 423, 427 of the second branch 420. The first switches 413 and 423 are PMOS transistors and the second switches 417 and 427 are NMOS transistors, so that the power amplification stage is made by a first CMOS inverter (413 and 417) and a second CMOS inverter (423 and 427) whose respective outputs are connected to the terminals of the load.

The amplitude control stage consists of the amplitude control modules 430,470, in series with the envelope control stage, consisting of the envelope control modules 440 and 460.

The structure of the amplitude control modules will be detailed later on.

The first and second envelope control modules 440 and 460 are implemented using MOSFET transistors. More specifically, the first envelope shaping module 440 comprises a first PMOS transistor, 441, located in the first branch 410 and a second PMOS transistor, 442, located in the second branch, 420. The source and the drain of the first PMOS transistor, 441, are respectively connected to the drain of the PMOS transistor, 413, and to the first midpoint, 415, connected to a first terminal of the load 450. Similarly, the source and the drain of the second PMOS transistor, 442, are respectively connected to the drain of the PMOS transistor, 423, and to the second midpoint, 425, connected to a second terminal of the load 450. The first and second transistors, 441, 442, of the first envelope control module 440 are controlled by a first envelope control signal ClkBBo−. This signal is generated by a first envelope control signal generation module, 445 (represented to the right of the figure) from a first control signal, ClkBBi+.

Symmetrically, the second envelope control module 460 comprises a first NMOS transistor, 461, located in the first branch 410 and a second NMOS transistor, 462, located in the second branch, 420. The source and the drain of the first NMOS transistor, 461, are respectively connected to the drain of the NMOS transistor, 417, and to the first midpoint, 415. Similarly, the source and the drain of the second NMOS transistor, 462, are respectively connected to the drain of the NMOS transistor, 427, and to the second midpoint, 425.

The first and second transistors, 461, 462, of the second envelope control module 460 are controlled by a second envelope control signal ClkBBo+. This signal is generated by a second envelope control signal generation module, 465 (represented to the right of the figure) from a second control signal, ClkBBi−.

The first and second envelope control signal generation modules have the same structure.

More specifically, considering the first envelope control signal generation module, 445, the first control signal, ClkBBi+, controls the gates of a pair of PMOS, 447, and NMOS, 448, transistors mounted in series between the power supply and the ground. The source of the PMOS transistor, 447 is connected to the power supply via a first variable resistor 446 and the source of the NMOS transistor, 448, is connected to the ground via a second variable resistor 449. The drains of the transistors 447 and 448 are interconnected. Thus, when the first control signal, ClkBBi+, comprises a high voltage pulse, the PMOS transistor 447 is off and the NMOS transistor 448 is on. As a result, the gate-source capacitance of transistor 441 and the gate-source capacitance of the transistor 442 are discharged through the second variable resistor 449. The signal ClkBBo− at the output of the first envelope control signal generation module decreases linearly in amplitude. The amplitude decrease rate is given by the aforementioned parallel gate-source capacitances and the value of the second variable resistor 449. At the end of the pulse, the PMOS transistor, 447, turns on and the NMOS transistor 448 turns off, the gate-source capacitances of the transistors 441 and 442 are then charged through the variable resistor 446 and the amplitude of the signal increases linearly. The amplitude increase rate is given by the aforementioned gate-source capacitances and the value of the first variable resistor, 446.

Considering now the second envelope control signal generation module, 465, the second control signal, ClkBBi−, controls the gates of a pair of PMOS, 467, and NMOS, 468, transistors mounted in series between the power supply and the ground. The source of the PMOS transistor, 467, is connected to the power supply via a first variable resistor 466 and the source of the NMOS transistor, 468, is connected to the ground via a second variable resistor 469. The drains of the transistors 467 and 468 are interconnected. Thus, when the second control signal, ClkBBi−, comprises a low voltage pulse, the PMOS transistor 467 is on and the NMOS transistor 468 is off. As a result, the gate-source capacitance of the transistor 461 and the gate-source capacitance of the transistor 462 are charged through the first variable resistor 466. The ClkBBo+ signal at the output of the second envelope control signal generation module increases linearly in amplitude. The amplitude increase rate is given by the aforementioned gate-source capacitances and the value of the first variable resistor 466. At the end of the pulse, the PMOS transistor 467 turns off and the NMOS transistor 468 turns on, the gate-source capacitances of the transistors 461 and 462 are then discharged through the variable resistor 469 and the amplitude of the signal ClkBBo+ decreases linearly. The amplitude decrease rate is given by the aforementioned gate-source capacitances and the value of the second variable resistor 469.

The first variable resistors 446 and 466 of the modules 445 and 465 advantageously have an identical structure illustrated in 480.

Such a first variable resistor is composed of a set of elementary resistors 481-1, . . . , 481-N mounted in series between the power supply voltage and the source of the PMOS transistor (447 or 467 as the case may be). Each elementary resistor 481-$n$ could be short-circuited by a corresponding transistor 482-2 (herein a PMOS transistor) connected in parallel on this elementary resistor. Consequently, the first resistance is determined by the sum of the elementary resistances that are not short-circuited (that is to say whose gate controls are in the high state). The elementary resistances could be selected so as to be identical, in which case the control code is thermometric, or follow a power 2 geometric progression, in which case the control code is binary.

Each of the first variable resistors 446, 466 could be short-circuited by means of a transistor (herein a PMOS transistor), represented in 485. The transistor 485 of the first envelope control signal generation module, 445 is controlled by the second validation signal, ClkRF opt−, and that of the second envelope control signal generation module, 465, is controlled by the first validation signal, ClkRF opt+. The function of this transistor is to initiate and terminate the shaping of the UWB pulse. The validation signals ClkRF opt+, ClkRF opt−, could therefore be considered as each giving the start and the end of the UWB pulses.

Similarly, the second variable resistors 449 and 469 of the modules 445 and 465 also advantageously have an identical structure, illustrated in 490. Such a second variable resistor is composed of a set of elementary resistors 491-1, . . . , 491-N connected in series between the source of the NMOS transistor (449 or 469 as the case may be) and the ground. Each elementary resistor 491-$n$ could be short-circuited by an associated transistor (herein an NMOS transistor), 492-$n$. Consequently, the second resistance is determined by the sum of the elementary resistances that are not short-circuited (that is to say whose gate controls are in the low state). Herein again, the elementary resistors may be selected so as to be identical, in which case the control code is thermometric, or follow a power 2 geometric progression, in which case the control code is binary.

Each of the second variable resistors 449, 469 could be short-circuited by means of a transistor (herein an NMOS transistor), represented in 495. The transistor 495 of the first envelope control signal generation module, 445, is controlled by the second validation signal, ClkRF opt− and that of the second envelope control signal generation module, 465, is controlled by the first validation signal, ClkRF opt+. Hence, this transistor has the function of initiating and terminating the shaping of the UWB pulse.

Figure 4B:
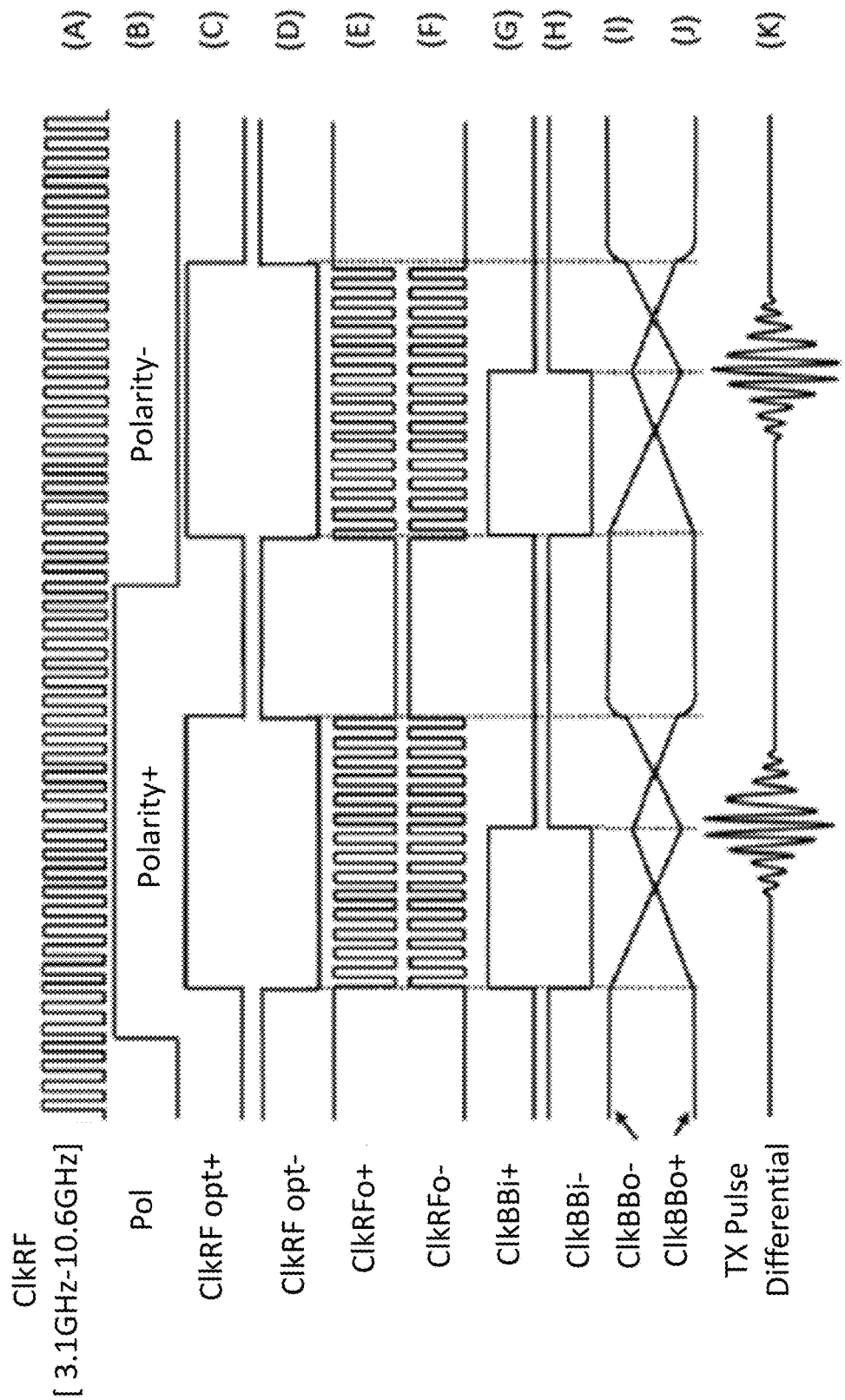
FIG. 4B represents a time chart of the signals intervening in the UWB emitter of FIG. 4A.

FIG. 4B represents a time chart of the signals involved in the generation of a UWB pulse by the emitter of FIG. 4A.

The line (A) gives the base clock, ClkRF, at the RF frequency, $f_o$, which will actually be the central frequency of the generated pulses.

The line (B) represents a polarity signal, Pol, in the case where a BPSK modulation is applied to the emitted signal. In the case where the polarity changes, the phase of the switching signals ClkRFo− and ClkRFo+, represented in (E) and (F) is inversed. Since the switching signals ClkRFo− and ClkRFo+ are inverse of each other, the change in polarity could be achieved simply by toggling these signals.

It should be noted that phase modulations of higher orders (QPSK, 8-PSK, etc.) are also possible as explained later on.

The first and second validation signals ClkRFopt− and ClkRFopt+, inverses of each other, are represented in lines (C) and (D). These signals temporally delimit each pulse and more specifically the interval during which a UWB pulse is shaped.

It is noticed that the switching signals ClkRFo− and ClkRFo+ comprise half-waves of the base clock only during the validation intervals defined by the signals ClkRFopt− and ClkRFopt+. Thus, the consumption of the "H"-bridge is further reduced since it is limited to the intervals during which the power amplification occurs. The positive half-waves of a UWB pulse are generated when the transistors 423 and 442, 461 and 417 are on (in which case the potential difference between the terminals 425 and 415 is positive) and the negative half-waves of a UWB pulse are generated when the transistors 413 and 441, 462 and 427 are on. The amplitude of the vibrations is differentially determined by the envelope control signals ClkBBo− and ClkBBo+.

The first and second control signals, ClkBBi+ and ClkBBi−, represented in (G) and (H) are inverses of each other. These signals temporally delimit the growth and decrease ramps of the envelope of the pulses.

The first envelope control signal ClkBBo− indicated in (I) has a decreasing ramp when the first control signal, ClkBBi+, is in the high state (and therefore the second control signal, ClkBBi−, is in the low state). Conversely, it has an increasing ramp when the first control signal, ClkBBi+, is in the low state.

Similarly, the second envelope control signal ClkBBo+ indicated in (J) has an increasing ramp when the second control signal, ClkBBi−, is in the low state (and therefore the first control signal, ClkBBi+, is in the high state). Conversely, it has a decreasing ramp when the second control signal, ClkBBi−, is in the high state.

As described above, the increasing and decreasing ramps of the envelope control signals ClkBBo− and ClkBBo+ are obtained by means of charging and discharging in RC circuits where R is a variable resistance (446, 466 for charging and 449, 469 for discharging) and C is a fixed capacitance corresponding to the sum of the gate-source capacitances (441 in parallel with 442 for ClkBBo− and 461 in parallel with 462 for ClkBBo+). Thus, the envelope control signals have a triangular shape, which allows for a satisfactory approximation of a Gaussian envelope shape.

The validation signals, ClkRFopt− and ClkRFopt+, set the first envelope control signal, ClkBBo− high, and the second envelope control signal, ClkBBo+ low. Thus, no increasing or decreasing ramp of modulation of the envelope of the pulses is therefore generated outside the time intervals defined by the validation signals, ClkRFopt− and ClkRFopt+, which reduces the consumption of the emitter to the strict minimum.

Finally, the voltage at the terminals of the load (antenna) has been represented in (K). The pulses only appear during the validation intervals defined by ClkRFopt− and ClkRFopt+. The shape of their envelope is modulated only during these intervals. These pulses further have the phase given by the modulation signal BPSK, Pol.

Figure 4C:
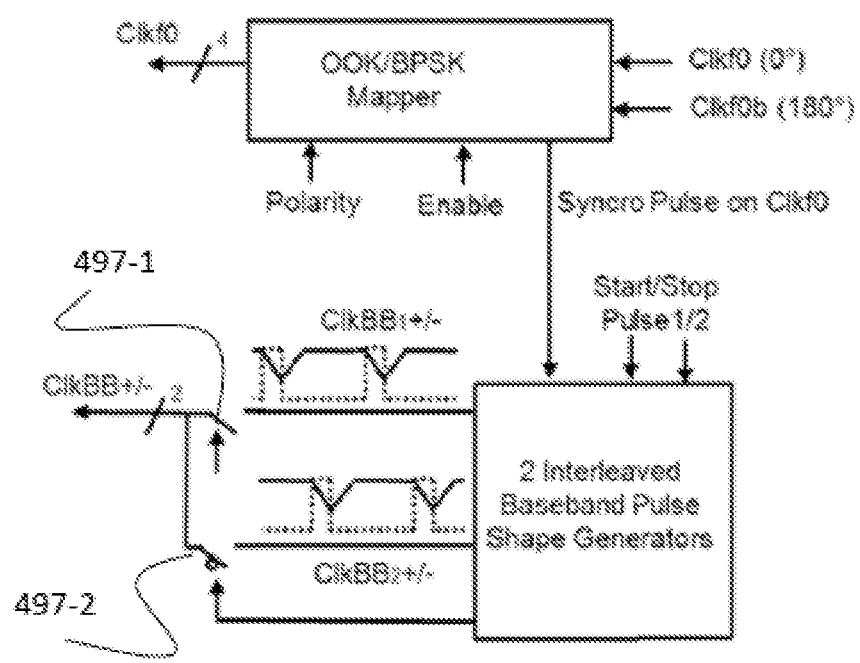
FIG. 4C schematically represents a circuit for generating clock signals and envelope control signals for the emitter of FIG. 4A in the case of emission of close pulse trains.

FIG. 4C schematically represents a circuit for generating clock signals and envelope control signals for the emitter of FIG. 4A in the case of emission of close pulse trains.

The first control signal, ClkBBi+ is herein decomposed into two (and more generally into a plurality of) interleaved control signals ClkBB1*i*+ and ClkBB2*i*+. In other words, each of these control signals has a pulse repetition frequency, half of that ClkBBi+ and a (positive) pulse on ClkBB2*i*+ follows a (positive) pulse on ClkBBi+. Each of signals ClkBB1*i*+ and ClkBB2*i*+ is injected into a first envelope control signal generation module, as represented by 445 in FIG. 4A. The corresponding output signals are denoted ClkBB1*o*− and ClkBB2*o*− are themselves interleaved. They are combined by means of switches such as 497-1 and 497-2 alternately passing a ClkBB1*o*− pulse and a ClkBB2*o*− pulse to provide the first envelope control signal ClkBBo−.

Similarly, the second control signal, ClkBBi−, is decomposed into two interleaved control signals ClkBB1*i*− and ClkBB2*i*−. In other words, each of these control signals has a pulse repetition frequency, half of that ClkBBi− and a (negative) pulse on ClkBB2*i*− follows a (negative) pulse on ClkBB1*i*−. Each of the signals ClkBB1*i*− and ClkBB2*i*− are injected into a second envelope control signal generation module, as represented by 465 in FIG. 4A. The corresponding output signals are denoted ClkBB1*o*+ and ClkBB2*o*+ are themselves interleaved. They are combined by means of switches such as 497-1 and 497-2 passing alternately a ClkBB1*o*+ pulse and a ClkBB2*o*+ pulse to provide the second envelope control signal ClkBBo+.

Thus, it is advantageously possible to generate UWB pulse trains, for example to emit 8 pulses separated by 4 ns and with alternating polarities as provided for in the IEEE 802.15.4z standard.

Figure 5:
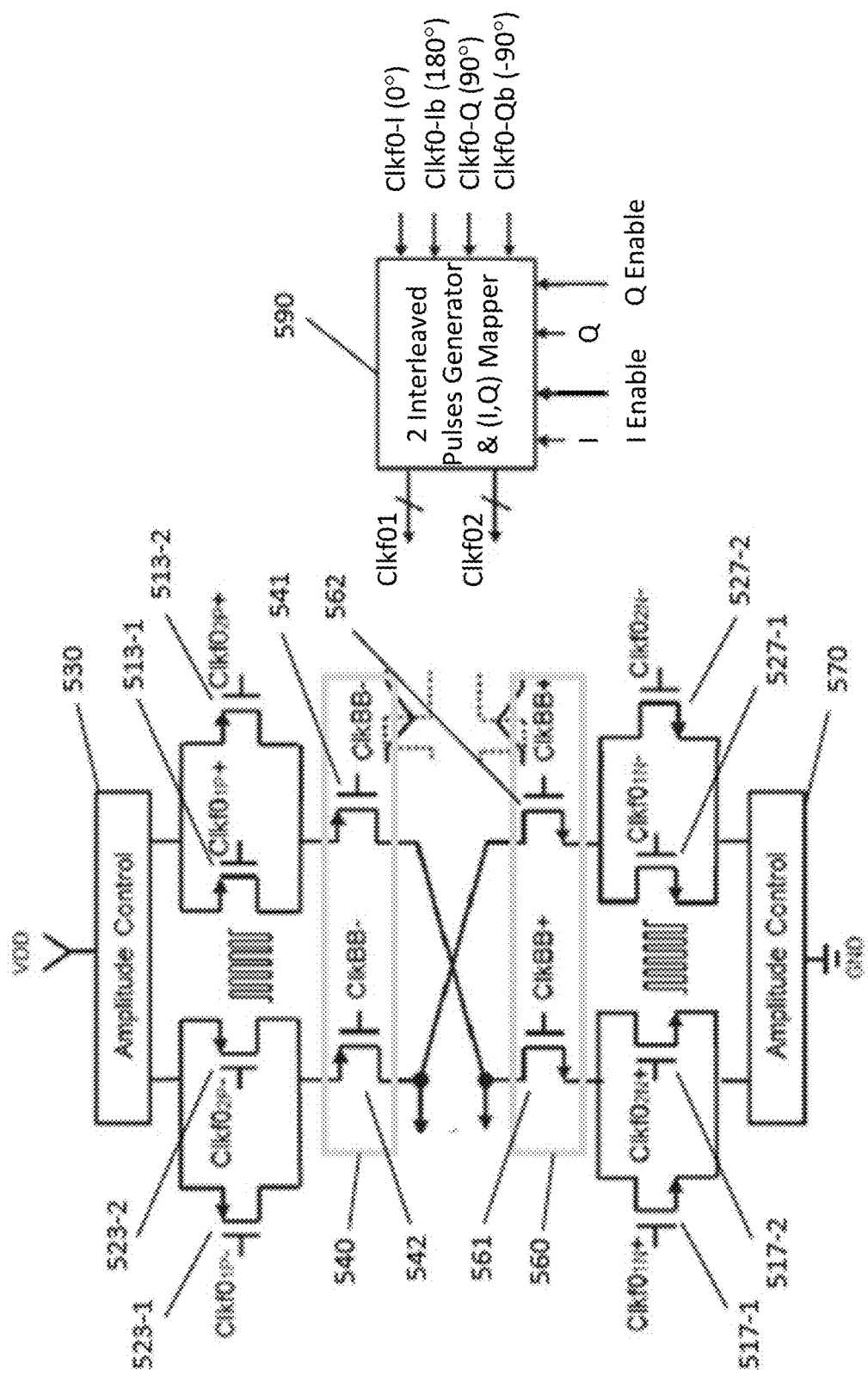
FIG. 5 schematically represents a UWB emitter according to the architecture of FIG. 3, suitable for performing QPSK or 8-PSK modulation.

FIG. 5 schematically represents a UWB emitter according to the architecture of FIG. 3, and implementing a QPSK or 8-PSK modulation.

The figure represents the envelope shaping stage, composed of the envelope control modules 540 and 560, identical to the modules 440 and 460 already described, and the amplitude control stage composed of the modules 530 and 570 identical to the modules 430 and 470, and whose structure will be described later on.

Unlike the UWB emitter of FIG. 4A, the power amplification stage comprises, in the first branch, two switches in parallel 513-1 and 513-2, located between the first common end and the first envelope control module 540, as well as two switches in parallel, 517-1 and 517-2, located between the second envelope control module 560 and the second common end.

More specifically, the switches 513-1 and 513-2 are PMOS transistors whose sources are connected to the first common end, whose high voltage is set by the first amplitude control module, and whose drains are connected to the source of the PMOS transistor 541. The gates of the transistors 513-1 and 513-2 are respectively controlled by the signals Clkf01P+ and Clkf02P+. Similarly, switches 517-1 and 517-2 are NMOS transistors whose sources are connected to the second common end, whose low voltage is set by the second amplitude control module and whose drains are connected to the source of the NMOS transistor 561. The gates of transistors 517-1 and 517-2 are respectively controlled by the signals Clkf01N+ and Clkf02N+.

Similarly, the switches 523-1 and 523-2 are PMOS transistors whose sources are connected to the first common end and whose drains are connected to the source of the PMOS transistor 542. The gates of the transistors 523-1 and 523-2 are respectively controlled by the signals Clkf01P− and Clkf02P−. Finally, the switches 527-1 and 527-2 are NMOS transistors whose sources are connected to the second common end and whose drains are connected to the source of the NMOS transistor 562. The gates of transistors 527-1 and 527-2 are respectively controlled by the signals Clkf01N− and Clkf02N−.

The signals Clkf01P+ and Clkf02P+, Clkf01N+ and Clkf02N+, Clkf01P− and Clkf02P−, Clkf01N− and Clkf02N− are generated from a switching signal generation system 590 represented on the right side of the figure. This system 590 receives as input the clocks Clkf0-I, Clkf0-Q, Clkf0-Ib and Clkf0-Qb at the frequency RF, $f_0$ (central frequency of the UWB pulses), respectively in phase (0°), in phase quadrature (90°), in phase opposition (180°) and in opposition phase quadrature (−90°). It also receives the components (I, Q) of the symbols to be transmitted. According to the values of I and Q the switching signal generation system multiplexes the input clocks on the aforementioned switching signals. The multiplexing table is given in Table I for different modulation types. For simplicity of notation, the clocks Clkf0-I, Clkf0-Q, Clkf0-Ib and Clkf0-Qb have been designated by the suffixes, I, Q, Ib, Qb in the table.

The QPSK modulation may be implemented in two possible versions. In a first version (called option 1 in Table I), for a QPSK symbol to be transmitted, two UWB pulses are generated simultaneously on the 2 quadrature channels, each pulse being modulated by the component of the considered QPSK symbol. In the second version (called option 2a in Table I), the UWB pulses carrying the 2 components of the symbol are generated alternately on the 2 channels. A variant in which the second channel is neutralised (columns 6-9) is also represented (option 2b in Table I). Of course, the first route could be neutralised instead of the second one.

The 8-PSK modulation may be implemented by combining the aforementioned options 1 and 2a as indicated in table I. Where necessary, the symbols (−1, −1), (−1, 1), (1, 1), (1, −1) may be normalised by a factor √T by acting on the amplitude control.

TABLE I

| 1 Modulation | 2 Clkf01N+ | 3 Clkf01N− | 4 Clkf01P+ | 5 Clkf01P− | 6 Clkf02N+ | 7 Clkf02N− | 8 Clkf02P+ | 9 Clkf02P− | 10 Phase |
|---|---|---|---|---|---|---|---|---|---|
| QPSK (option 1) | | | | | | | | | |
| (−1, −1) | Ib | I | Ib | I | Qb | Q | Qb | Q | −135° |
| (−1, 1) | Ib | I | Ib | I | Q | Qb | Q | Qb | 135° |
| (1, 1) | I | Ib | I | Ib | Q | Qb | Q | Qb | 45° |
| (1, −1) | I | Ib | I | Ib | Qb | Q | Qb | Q | −45° |
| QPSK (option 2a) | | | | | | | | | |
| (−1, 0) | Ib | I | Ib | I | 0 | 0 | 1 | 1 | 180° |
| (0, 1) | 0 | 0 | 1 | 1 | Q | Qb | Q | Qb | 90° |
| (1, 0) | I | Ib | I | Ib | 0 | 0 | 1 | 1 | 0° |
| (0, −1) | 0 | 0 | 1 | 1 | Qb | Q | Qb | Q | −90° |

TABLE I-continued

| 1 Modulation | 2 Clkf01N+ | 3 Clkf01N− | 4 Clkf01P+ | 5 Clkf01P− | 6 Clkf02N+ | 7 Clkf02N− | 8 Clkf02P+ | 9 Clkf02P− | 10 Phase |
|---|---|---|---|---|---|---|---|---|---|
| QPSK (option 2b) | | | | | | | | | |
| (−1, 0) | Ib | I | Ib | I | 0 | 0 | 1 | 1 | 180° |
| (0, 1) | Q | Qb | Q | Qb | 0 | 0 | 1 | 1 | 90° |
| (1, 0) | I | Ib | I | Ib | 0 | 0 | 1 | 1 | 0° |
| (0, −1) | Qb | Q | Qb | Q | 0 | 0 | 1 | 1 | −90° |
| 8-PSK | | | | | | | | | |
| (−1, −1) | Ib | I | Ib | I | Qb | Q | Qb | Q | −135° |
| (−1, 0) | Ib | I | Ib | I | 0 | 0 | 1 | 1 | 180° |
| (−1, 1) | Ib | I | Ib | I | Q | Qb | Q | Qb | 135° |
| (0, 1) | 0 | 0 | 1 | 1 | Q | Qb | Q | Qb | 90° |
| (1, 1) | I | Ib | I | Ib | Q | Qb | Q | Qb | 45° |
| (1, 0) | I | Ib | I | Ib | 0 | 0 | 1 | 1 | 0° |
| (1, −1) | I | Ib | I | Ib | Qb | Q | Qb | Q | −45° |
| (0, −1) | 0 | 0 | 1 | 1 | Qb | Q | Qb | Q | −90° |

Figure 6:
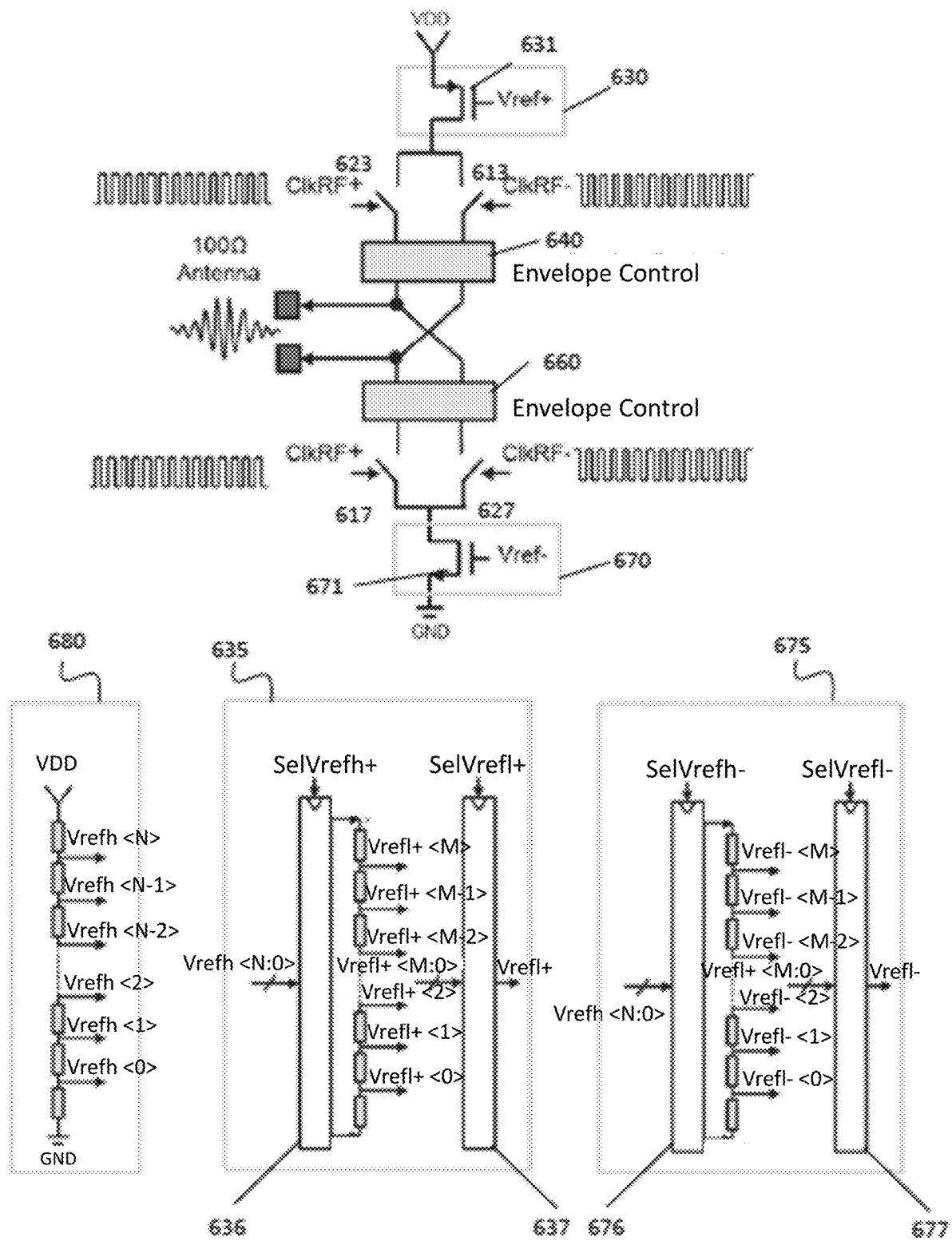
FIG. 6 schematically represents a UWB emitter according to the architecture of FIG. 3, equipped with an amplitude control stage according to a first implementation variant.

FIG. 6 schematically represents a UWB emitter according to the architecture of FIG. 3, equipped with an amplitude control stage according to a first implementation variant.

The figure represents the power amplification stage composed of switches 613 and 617 in the first branch, and switches 623 and 627 in the second branch. The envelope control stage is in series with the power amplification stage. It is composed of the 640 and 660 modules, identical to the 440 and 460 modules already described.

The amplitude control stage, also in series with the power amplification stage and the envelope control stage, is composed of a first amplitude control module, 630, located between the first common end and the supply voltage, as well as a second amplitude control module, 670, located between the second end and ground. More specifically, the first module, 630, herein consists of a single PMOS transistor, 631, whose source is connected to the supply VDD and whose drain is connected to the first common end. To this first common end are connected, on the one hand, the source of the first switching transistor of the first branch, 613, and, on the other hand, the source of the first switching transistor of the second branch, 623. Similarly, the second module, 670, consists of a single NMOS transistor, 671, whose source is connected to ground and whose drain is connected to the second common end. To this second common end are connected, on the one hand, the source of the second transistor of the first branch, 617, and, on the other hand, the source of the second transistor of the second branch, 627.

The signal applied on the gate of the transistor 631, Vref+, is generated by means of a coarse voltage ladder, 680, whose outputs are provided at a first fine voltage ladder 635. Similarly, the signal applied on the gate of the transistor 671, Vref−, is generated by means of said coarse voltage ladder, 680, whose outputs are provided at a second fine voltage ladder, 675.

The coarse voltage ladder, 680, is common to the generation of the signals Vref+ and Vref−. This simply consists of a first set of N+1 elementary resistors of the same value, in series between the power supply voltage VDD and ground.

The N+1 reference voltages Vrefh <0>, Vrefh <1>, . . . , Vrefh <N>, available at the intermediate nodes of the coarse voltage ladder are supplied to the multiplexer 636 at the input of the first fine voltage ladder 635. This input multiplexer selects by means of a first selection signal SelVrefh+ two successive reference voltages Vrefh <n> and Vrefh <n+1> among the N+1 available reference voltages of 680. The second fine voltage ladder comprises M+1 elementary resistors (of the same value) arranged in series between the two reference voltages thus selected Vrefh <n> and Vrefh <n+1>. The M+1 reference voltages, Vrefl+<0>, . . . , Vrefl+<M> available at the intermediate nodes of this second ladder are supplied to an output multiplexer 637. This output multiplexer selects by means of a second selection signal SelVrefl+ a reference voltage Vrefl+<m>, . . . , among the M+1 available ones and supplies it at the output as a signal Vref+.

Similarly, the N+1 reference voltages Vrefh <0>, Vrefh <1>, . . . , Vrefh <N>, available at the intermediate nodes of the coarse voltage ladder are supplied to the multiplexer 676, at the input of the second fine voltage ladder 675. This input multiplexer selects by means of a first selection signal SelVrefh− two successive reference voltages Vrefh− <n> and Vrefh− <n+1> among the N+1 available reference voltages. A second fine voltage ladder comprises M+1 elementary resistors (of the same value) arranged in series between the two reference voltages thus selected Vrefh− <n> and Vrefh− <n+1>. The M+1 reference voltages, Vrefl− <0>, . . . , Vrefl− <M>, . . . , available at the intermediate nodes of this second ladder are supplied to an output multiplexer 677. This output multiplexer selects by means of a second selection signal SelVrefl− a reference voltage Vrefl− <m>, . . . , among the M+1 available ones and outputs it as a signal Vref−.

The application of the signal Vref+ on the gate of the transistor 631 and that of the signal Vref− on the gate of the transistor 671 allows adjusting the drain-source resistances of these transistors and therefore lowering the high voltage with respect to the power supply voltage (by means of Vref+) as well as raising the minimum voltage with respect to the ground (by means of Vref−) when these transistors are crossed by a current. Thus, the joint action of the transistors 631 and 671 allows varying the amplitude of the envelope homothetically and over a wide dynamic range, independently of the control of the shape of the envelope.

The consumption of the circuits generating the signals Vref+ and Vref− is limited to that induced by the current (a few μA) circulating in the voltage ladders.

Figure 7:
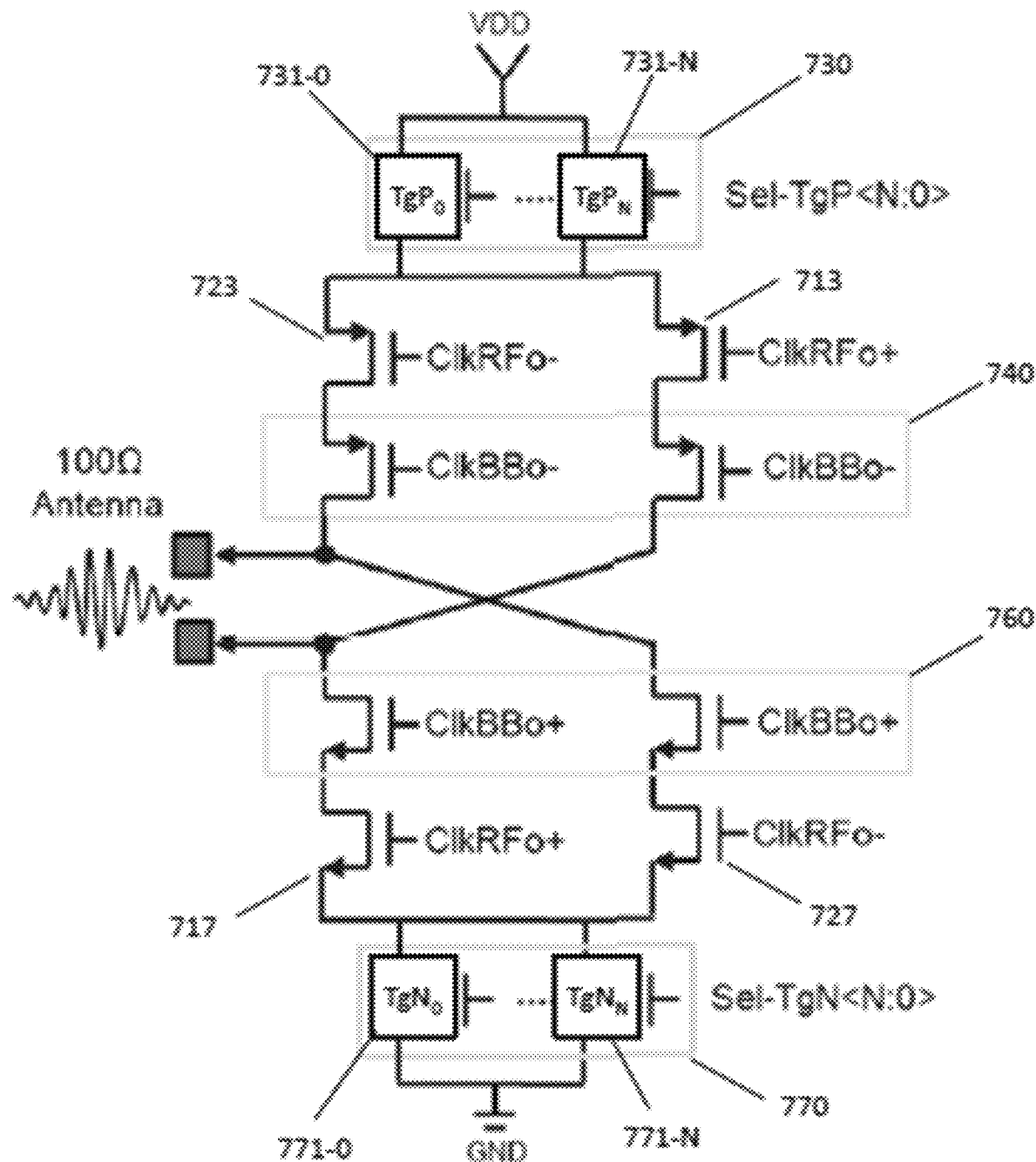
FIG. 7 schematically represents a UWB emitter according to the architecture of FIG. 3, equipped with an amplitude control stage according to a second implementation variant.

FIG. 7 schematically represents a UWB emitter according to the architecture of FIG. 3, equipped with an amplitude control stage according to a second implementation variant.

The power amplification stage composed of switches 713 and 717 in the first branch, and switches 723 and 727 in the second branch is identical to that of FIG. 6. Similarly, the envelope shape control stage consists of the modules 740 and 760, respectively identical to modules 640 and 660 of FIG. 6.

However, the first amplitude control module, 730, located between the first common end and the supply voltage, as well as the second amplitude control module, 770, located between the second common end and the ground, differ from the corresponding modules 630 and 670 of FIG. 6.

Indeed, the first amplitude control module, 730, is composed of a plurality of first transmission gates, 731-0, 731-1, . . . , 731-N, mounted in parallel between the power supply voltage VDD and the first common end connecting the sources of the PMOS transistors 713 and 723. The first transmission gates may consist of simple PMOS transistors. Alternatives of these transmission gates may be considered by a person skilled in the art.

Thus, by selecting the first transmission gates by means of the first selection signals Sel-TgP <0>, Sel-TgP <1>, . . . , Sel-TGP <N>, it is possible to adjust the equivalent resistance between voltage VDD and the common node of the sources of the MOS transistors. As soon as a current passes through the bridge, it is consequently possible to lower the high voltage using the aforementioned selection signals.

Similarly, the second amplitude control module, 770, consists of a plurality of second transmission gates, 771-0, 771-1, . . . , 771-N, mounted in parallel between the second common end connecting the sources of the NMOS transistors 717 and 727, and the ground. The second transmission gates may consist of simple NMOS transistors. Alternatives of these transmission gates may be considered by a person skilled in the art.

As soon as a current passes through the bridge, it is consequently possible to raise the low voltage using the second selection signals Sel-TgN <0>, Sel-TgN <1>, . . . , Sel-TgN <N> respectively controlling the gates 771-0, 771-1, . . . , 771-N.

The implementation variant of the amplitude control modules illustrated in FIG. 7 has the advantage, compared to that illustrated in FIG. 6, of consuming no static power. Indeed, it is not necessary herein to provide resistor ladders to generate reference voltages and therefore no current is consumed except that necessary for the generation of the pulses through the load.

Other implementation variants of the amplitude control modules could also be considered without departing from the scope of the present invention. In particular, the amplitude control modules may be made by means of LDO voltage regulators (Low DropOut regulator).

Figure 8:
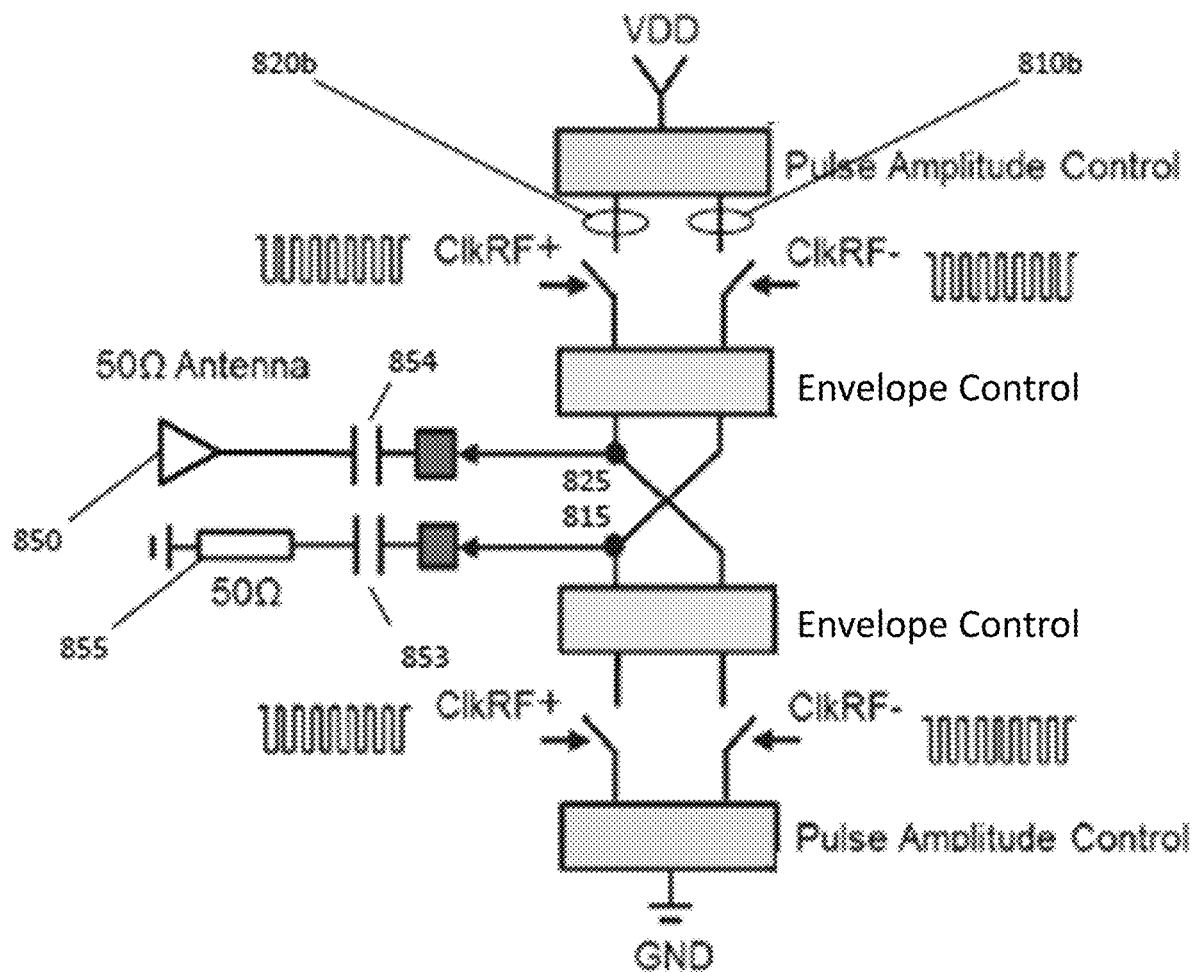
FIG. 8 schematically represents the general architecture of a UWB emitter, according to a second embodiment of the invention.

FIG. 8 schematically represents the general architecture of a UWB emitter, according to a second embodiment of the invention.

The amplitude control, power amplification and envelope shape control stages are identical to those of the first embodiment described in connection with FIG. 3. Hence, their description will not be repeated herein.

However, unlike the first embodiment, the UWB antenna, 850, is not fed in differential mode but is a single feed antenna. More specifically, the midpoint 815 of the first branch 810b, forming a first output of the emitter, is connected to a characteristic load of 50Ω, 855, via a decoupling capacitor, 853. The midpoint 825, of the second branch, 820b, forming a second output of the emitter is connected through a decoupling capacitor, 854, to the antenna 850. The capacitors 853 and 854 have identical values and are intended to impose no point of polarisation at the output of the emitter.

A person skilled in the art should understand that the different variants and embodiments disclosed in connection with the first embodiment are also applicable to the second embodiment.

In the first and second embodiments, it has been assumed that the amplitude control was performed by a first amplitude control module operating from the power supply terminal to vary a high voltage and by a second amplitude control module operating from the ground to vary a low voltage. Nonetheless, a person skilled in the art should understand that a single amplitude control module could alternatively be provided, either to vary the high voltage or to vary the low voltage.

Figure 9:
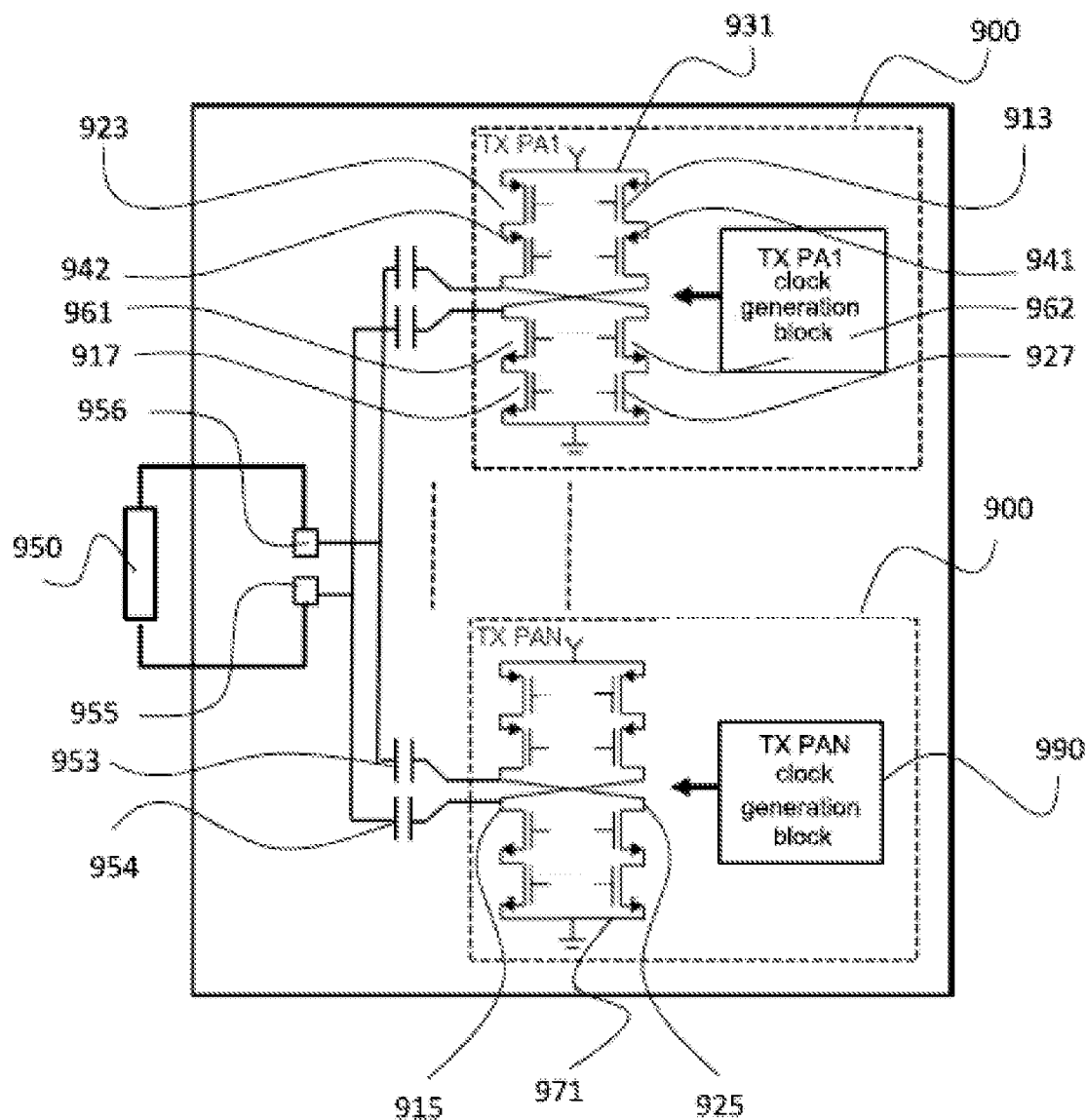
FIG. 9 schematically represents the general architecture of a UWB emitter according to a third embodiment of the invention.

FIG. 9 schematically represents the general architecture of a UWB emitter according to a third embodiment of the invention.

The third embodiment differs from the previous ones in that it comprises a plurality of H-bridges connected in parallel, the UWB pulses of each of the bridges being independently controlled and being combined at the terminals of a common UWB antenna through decoupling capacitors.

In this embodiment, the structure of the H-bridges may be in accordance with the first or the second embodiment, as described above.

For simplicity and without prejudice to generalisation, we will assume in the following that the structure of the bridges is in accordance with the first embodiment.

More specifically, the UWB emitter comprises a plurality N of H-bridges connected in parallel, 900, bearing the specific references TX PA1, . . . , TC PAN. The respective first midpoints, 915, of the first branches of each of these bridges are connected to a first common terminal 955 through a plurality of first bridge decoupling capacitors, 954. Similarly, the second midpoints, 925, of the second branches of these bridges, are connected to a second common terminal, 956, through a plurality of second bridge decoupling capacitors, 953.

The UWB antenna, 950, is connected between the first common terminal and the second common terminal. Nonetheless, it should be understood that in the case where the structure of the bridges is in accordance with the second embodiment, the UWB antenna will be connected only to one of these common terminals, the other common terminal being connected to ground via a characteristic impedance.

The bridge decoupling capacitors ensure the absence of interaction between the continuous components of the various bridges while allowing the combination, at the terminals of the antenna, of the alternating components of the UWB pulses generated by the different bridges.

Each H-bridge comprises a first amplitude control module (not represented) between the supply terminal and the first common end, 931, at the two branches of said bridge, allowing varying the high voltage at this first common end. Similarly, a second amplitude control module (not represented) between the second common end, 971, at the first and second branches of said bridge and the ground, allows varying the low voltage at the second common end.

Each H-bridge comprises, like in the previous embodiments, a first envelope control module 941, 942 between the first switches 913, 923 and the respective midpoints 915, 925 of the first and second branches, intended to shape the envelope of the positive part of the UWB pulse generated by this bridge, by means of a first baseband signal (ClkBB−) associated with this bridge.

It further comprises a second envelope control module 961, 962 between said midpoints 915, 925 and the second switches of this bridge, 917, 927, intended to shape the envelope of the negative part of the UWB pulse generated by this bridge by means of a second baseband signal (ClkBB+) associated with this bridge.

Like in the previous embodiments, for each bridge, 900, the switching state of the first (resp. second) switch of the first branch is opposite to the switching state of the first (resp. second) switch of the second branch, each switch being switched at the same central RF frequency giving the central frequency of the UWB pulses generated by this bridge.

It should be noted that the first envelope control modules of the different bridges are controlled by first baseband signals independent of each other. Similarly, the second envelope control modules of the different bridges are controlled by second baseband signals independent of each other. The first and second baseband signals are generated by independent modules, 990.

The first and second switches of the first branches of the different bridges are advantageously switched at the same RF frequency by the same signal ClkRF0+. Similarly, the first and second switches of the second branches of the different bridges are switched at this same RF frequency by the same signal ClkRF0−, the inverse of the previous one. Consequently, the control signals for these switches could be generated by a common module. Alternatively, they could be generated by the independent modules, 990, from a common RF clock.

The third embodiment allows generating elementary pulse trains, the elementary pulse trains could be very close to each other or even overlap in time with a great control flexibility. In particular, the polarity of each elementary pulse could be individually controlled by means of the first and second baseband signals. This control flexibility also allows ensuring that the elementary pulse train is compliant with the UWB spectral masks defined in the standards in force (ETSI, FCC, ARIB in particular).

Figure 10B:
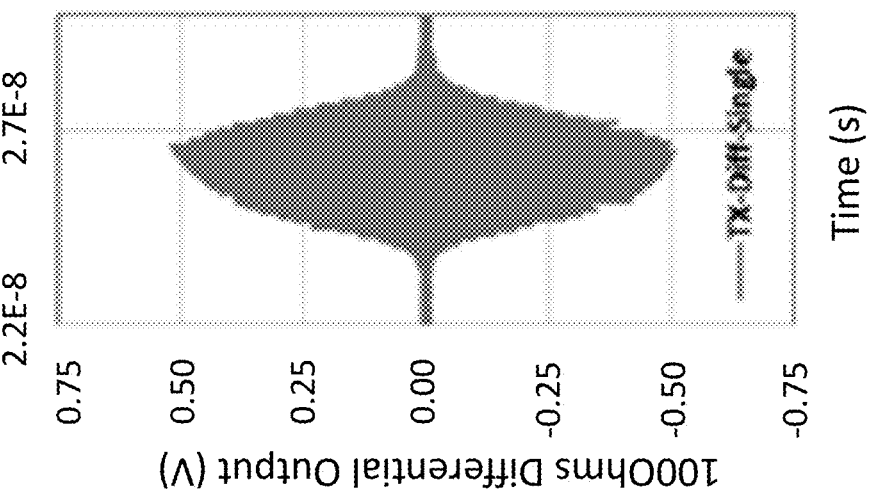
FIG. 10B illustrates an elementary pulse of the pulse train of FIG. 10A.
Figure 10A:
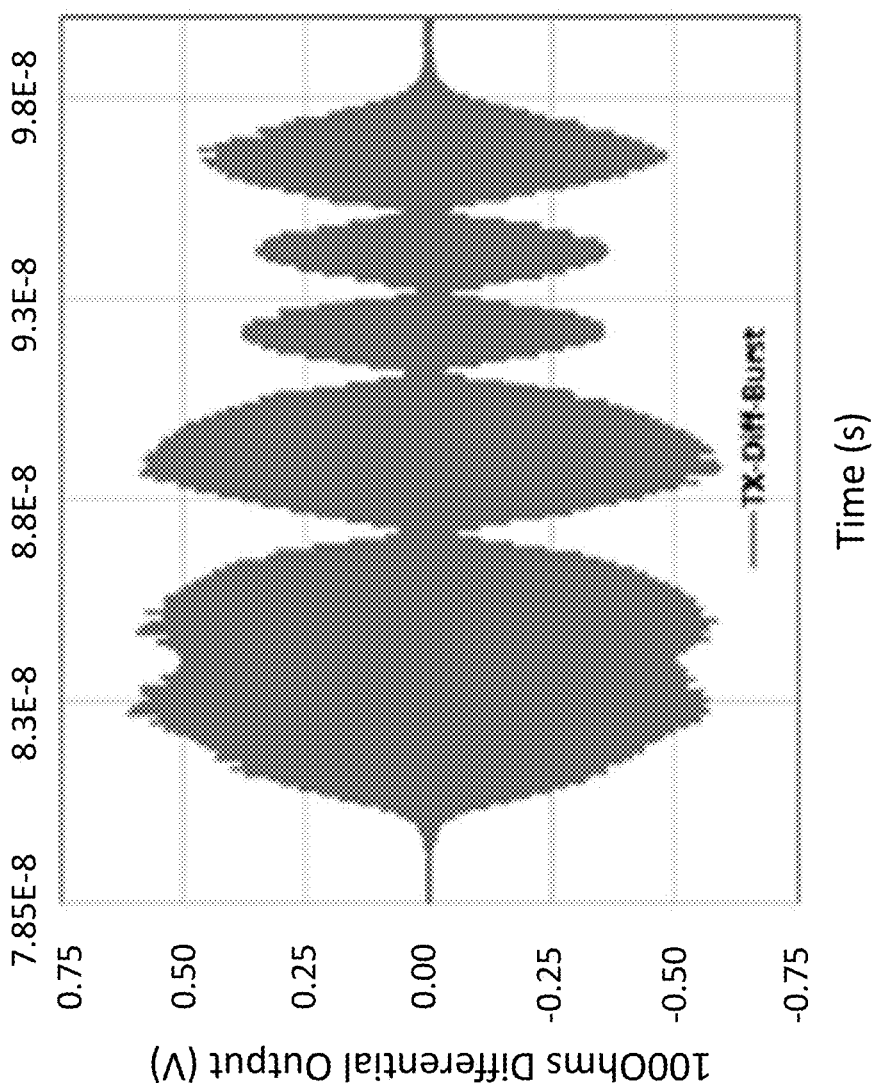
FIG. 10A illustrates an example of a pulse train generated by the UWB emitter of FIG. 9.

FIG. 10A represents in the time domain an elementary pulse train that could be generated by the UWB pulse emitter of FIG. 9 and FIG. 10B represents an elementary pulse of this train.

Figure 10C:
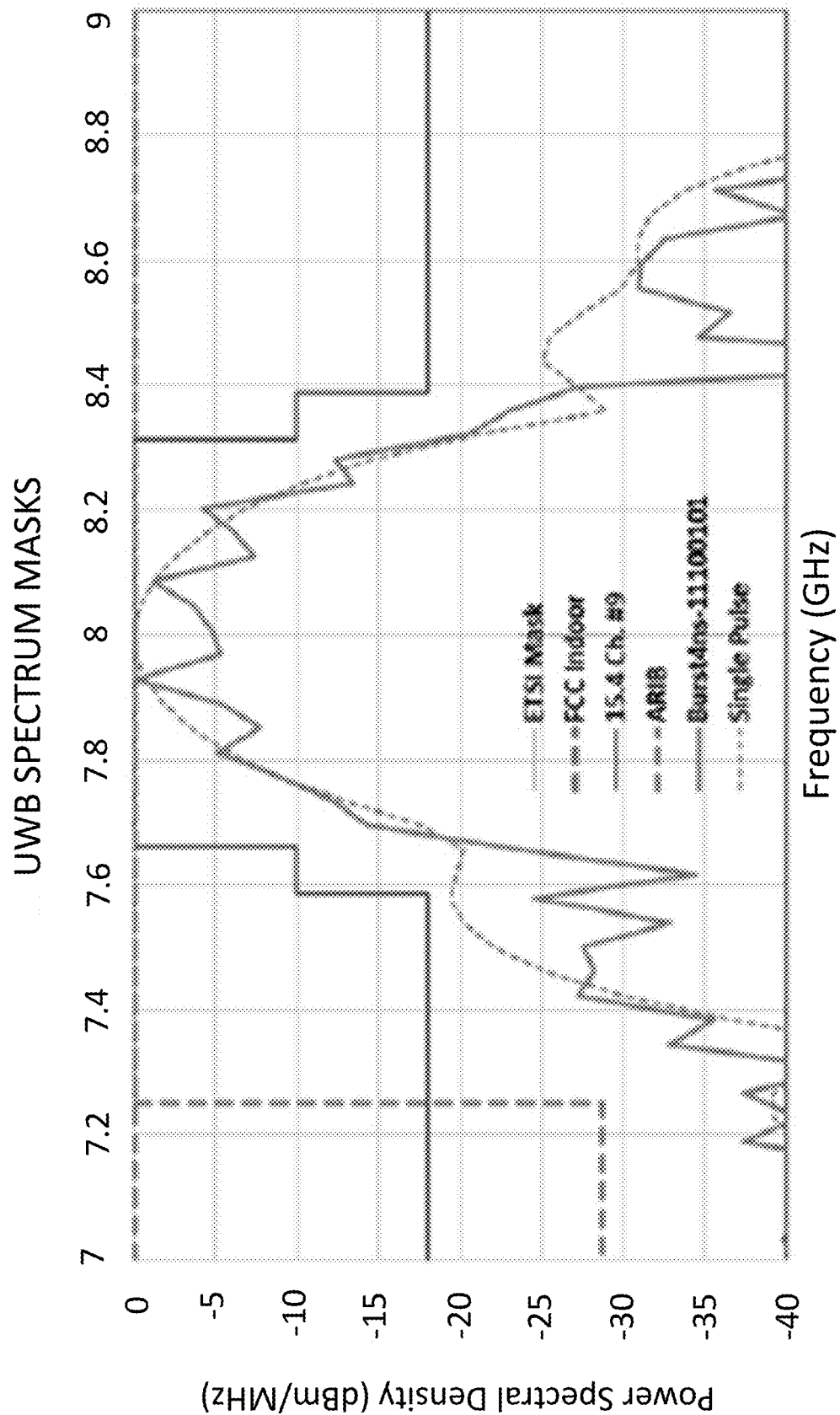
FIG. 10C illustrates the spectral occupation of the pulse train of FIG. 10A as well as that of the elementary pulse of FIG. 10B.

FIG. 10C represents the spectrum of the elementary pulse train of FIG. 10 and that of the elementary pulse of FIG. 10B. It is noticed that the two spectra are actually in compliance with the aforementioned spectral masks.

Finally, it is essential to point out that the proposed solution is much simpler than that which would have consisted in defining the overall temporal support of the elementary pulse train for a single H-bridge with a resolution in the range of a fraction of the RF period.

What is claimed is:

1. A UWB pulse emitter comprising:
at least one H-bridge, said at least one H-bridge having a first branch and a second branch in parallel, a first end common to the first and second branches being connected to a high voltage and a second end common to the first and second branches being connected to a low voltage, the first branch comprising a first midpoint and the second branch comprising a second midpoint, a UWB antenna being connected to the first midpoint and/or to the second midpoint, the first branch comprising a first switch between said first common end and the first midpoint as well as a second switch between the first midpoint and the second common end, the second branch comprising a first switch between said first common end and the second midpoint as well as a second switch between the second midpoint and the second common end, the first and second switches of a branch being in opposite switching states and the switching state of the first switch of the first branch being opposite to the switching state of the first switch of the second branch, each switch being switched at the same RF frequency giving the central frequency of the UWB pulses;
a first amplitude control module between a power supply terminal and the first common end, allowing varying said high voltage at the first common end, and/or a second amplitude control module between the second common end and the ground, allowing varying said low voltage at the second common end;
a first envelope control module between the first switches and the midpoints of the two branches, intended to shape the envelope of the positive part of a UWB pulse by means of a first baseband signal; and
a second envelope control module between the midpoints and the second switches of the two branches, intended to shape the envelope of the negative part of a UWB pulse by means of a second baseband signal.

2. The UWB pulse emitter according to claim 1, wherein the UWB antenna is connected between the first midpoint and the second midpoint.

3. The UWB pulse emitter according to claim 1, wherein the UWB antenna is connected to the first midpoint via a first decoupling capacitor, and the second midpoint is connected to the ground via a second decoupling capacitor in series with a characteristic impedance.

4. The UWB pulse emitter according to claim 1, wherein the first switches are PMOS transistors and the second switches are NMOS transistors, the first and second switches of the first branch being controlled by a first control signal and the first and second switches of the second branch being controlled by a second control signal, the inverse of the first control signal.

5. The UWB pulse emitter according to claim 1, wherein:
the first amplitude control module comprises a PMOS transistor whose source is connected to the power supply voltage and whose drain is connected to the first common end, said PMOS transistor being controlled by a high reference voltage, obtained as the voltage at an intermediate node of a first resistor ladder; and/or
the second amplitude control module comprises an NMOS transistor whose source is connected to the second common end and whose drain is connected to ground, said NMOS transistor being controlled by a low reference voltage, obtained as the voltage at an intermediate node of a second resistor ladder.

6. The UWB pulse emitter according to claim 5, wherein the first resistor ladder is connected between two consecutive first intermediate nodes of a coarse resistor ladder, itself connected between the power supply voltage and the ground, these two consecutive first intermediate nodes being selected by means of a first multiplexer, and that the second resistor ladder is connected between two consecutive second intermediate nodes of said coarse resistor ladder, these two consecutive second intermediate nodes being selected by means of a second multiplexer.

7. The UWB pulse emitter according to claim 1, wherein:
the first amplitude control module comprises a plurality of first transmission gates mounted in parallel, whose inputs are connected to the power supply voltage and whose outputs are connected to the first common end, the plurality of first transmission gates being individually controlled by a plurality of first selection signals; and/or the second amplitude control module comprises a plurality of second transmission gates mounted in parallel, whose inputs are connected to the second common end and whose outputs are connected to ground, the plurality of second transmission gates being individually controlled by a plurality of second selection signals.

8. The UWB pulse emitter according to claim 1, wherein the first amplitude control module comprises a first LDO voltage regulator and/or the second amplitude control module comprises a second LDO voltage regulator.

9. The UWB pulse emitter according to claim 1, wherein:
the first envelope control module comprises a first switch in the first branch as well as a first switch in the second branch, said first switches of the first envelope control module being controlled by means of a first shape control signal; and
the second envelope control module comprises a second switch in the first branch as well as a second switch in the second branch, said second switches of the second control module being controlled by means of a second shape control signal.

10. The UWB pulse emitter according to claim 9, wherein the first switches of the first envelope control module are PMOS transistors and the second switches of the second envelope control module are second NMOS transistors.

11. The UWB pulse emitter according to claim 10, wherein the first shape control signal is generated by integrating a first current in a RC1 circuit where C1 is the sum of the gate-source capacitances of the PMOS transistors of the first envelope control module and the second shape control signal is generated by integrating a second current in a RC2 circuit where C2 is the sum of the gate-source capacitances of the NMOS transistors of the second envelope control module.

12. The UWB pulse emitter according to claim 1, comprising:
a plurality of said H-bridges mounted in parallel, the first midpoints of the first branches of these bridges being connected to a first common terminal through a plurality of first bridge decoupling capacitors, the second midpoints of the second branches of these bridges being connected to a second common terminal through a plurality of second bridge decoupling capacitors, the UWB antenna being connected to the first and/or second common terminal;
and, for each of the plurality of said H-bridges:
a first amplitude control module between a supply terminal and the first end common to the first and second branches of each said H-bridge, allowing varying the high voltage at this first common end, and/or a second amplitude control module between the second end common to the first and second branches of each said H-bridge and the ground, allowing varying the low voltage at the second common end;
a first envelope control module between the first switches of each said H-bridge and the midpoints of the first and second branches of this bridge, intended to shape the envelope of the positive part of the UWB pulse generated by this bridge, by means of a first baseband signal associated with this H-bridge; and
a second envelope control module between the midpoints of the first and second branches of each said H-bridge and the second switches of this bridge, intended to shape the envelope of the negative part of the UWB pulse generated by this bridge by means of a second baseband signal associated with this bridge,
the first baseband signals of the different bridges being independent of each other and the second baseband signals of the different bridges also being independent of each other.

13. The UWB pulse emitter according to claim 12, wherein the first amplitude control module and the second amplitude control module are common to all of the plurality of said H-bridges.

14. The UWB pulse emitter according to claim 12, wherein the first and second switches of the first branches of the different bridges are switched by means of a first RF switching signal and that the first and second switches of the second branches of the different bridges are switched by means of a second RF switching signal, inverse of the first RF switching signal.

15. A UWB pulse emitter comprising:
at least one H-bridge, said at least one H-bridge having a first branch and a second branch in parallel, a first end common to the first and second branches being connected to a high voltage and a second end common to the first and second branches being connected to a low voltage, the first branch comprising a first midpoint and the second branch comprising a second midpoint, a UWB antenna being connected to the first midpoint and/or to the second midpoint, wherein the first branch includes two first switches in parallel between said first common end and the first midpoint, as well as two second switches in parallel between the first midpoint and the second common end, and that the second branch also includes two first switches in parallel between said first common end and the second midpoint, as well as two second switches in parallel between the second midpoint and the second common end, the respective switching signals of the first switches of the first and second branches as well as respective switching signals of the second switches of the first and second branches being supplied by a multiplexer receiving as input clock signals at the frequency RF, respectively in phase, in phase quadrature, in phase opposition and in opposition phase quadrature, said multiplexer being controlled by the components of a QPSK or 8-PSK symbol to be transmitted;
a first amplitude control module between a power supply terminal and the first common end, allowing varying said high voltage at the first common end, and/or a second amplitude control module between the second common end and the ground, allowing varying said low voltage at the second common end;
a first envelope control module between the first switches and the midpoints of the two branches, intended to shape the envelope of the positive part of a UWB pulse by means of a first baseband signal; and
a second envelope control module between the midpoints and the second switches of the two branches, intended to shape the envelope of the negative part of a UWB pulse by means of a second baseband signal.

16. The UWB pulse emitter according to claim 15, wherein the UWB antenna is connected between the first midpoint and the second midpoint.

17. The UWB pulse emitter according to claim 15, wherein:
the first amplitude control module comprises a PMOS transistor whose source is connected to the power supply voltage and whose drain is connected to the first common end, said PMOS transistor being controlled by a high reference voltage, obtained as the voltage at an intermediate node of a first resistor ladder; and/or the second amplitude control module comprises an NMOS transistor whose source is connected to the second common end and whose drain is connected to ground, said NMOS transistor being controlled by a low reference voltage, obtained as the voltage at an intermediate node of a second resistor ladder.

18. The UWB pulse emitter according to claim 15, wherein the first amplitude control module comprises a first LDO voltage regulator and/or the second amplitude control module comprises a second LDO voltage regulator.

19. The UWB pulse emitter according to claim 15, wherein:

the first envelope control module comprises a first switch in the first branch as well as a first switch in the second branch, said first switches of the first envelope control module being controlled by means of a first shape control signal; and the second envelope control module comprises a second switch in the first branch as well as a second switch in the second branch, said second switches of the second control module being controlled by means of a second shape control signal.

20. The UWB pulse emitter according to claim 15, comprising:

a plurality of said H-bridges mounted in parallel, the first midpoints of the first branches of these bridges being connected to a first common terminal through a plurality of first bridge decoupling capacitors, the second midpoints of the second branches of these bridges being connected to a second common terminal through a plurality of second bridge decoupling capacitors, the UWB antenna being connected to the first and/or second common terminal;

and, for each of the plurality of said H-bridges:

a first amplitude control module between a supply terminal and the first end common to the first and second branches of each said H-bridge, allowing varying the high voltage at this first common end, and/or a second amplitude control module between the second end common to the first and second branches of each said H-bridge and the ground, allowing varying the low voltage at the second common end;

a first envelope control module between the first switches of each said H-bridge and the midpoints of the first and second branches of this bridge, intended to shape the envelope of the positive part of the UWB pulse generated by this bridge, by means of a first baseband signal associated with this H-bridge; and a second envelope control module between the midpoints of the first and second branches of each said H-bridge and the second switches of this bridge, intended to shape the envelope of the negative part of the UWB pulse generated by this bridge by means of a second baseband signal associated with this bridge, the first baseband signals of the different bridges being independent of each other and the second baseband signals of the different bridges also being independent of each other.

\* \* \* \* \*